Nov. 11, 1969

KIYOSHI INOUE 3,477,948

MAGNETIC FILTER AND METHOD OF OPERATING SAME

Filed Dec. 1, 1966

INVENTOR
KIYOSHI INOUE
BY
Karl G. Ross
ATTORNEY

Nov. 11, 1969　　　　KIYOSHI INOUE　　　　3,477,948
MAGNETIC FILTER AND METHOD OF OPERATING SAME
Filed Dec. 1, 1966　　　　　　　　　　　　3 Sheets-Sheet 2

INVENTOR
KIYOSHI INOUE
BY
Karl F. Ross
ATTORNEY

Nov. 11, 1969   KIYOSHI INOUE   3,477,948
MAGNETIC FILTER AND METHOD OF OPERATING SAME
Filed Dec. 1, 1966   3 Sheets-Sheet 3

INVENTOR
KIYOSHI INOUE
BY Karl F. Ross
ATTORNEY

United States Patent Office 3,477,948
Patented Nov. 11, 1969

3,477,948
MAGNETIC FILTER AND METHOD OF OPERATING SAME
Kiyoshi Inoue, 182 3-chome, Tamagawayoga-machi, Setagaya-ku, Tokyo, Japan
Filed Dec. 1, 1966, Ser. No. 598,512
Claims priority, application Japan, Dec. 13, 1965, 40/76,842; July 13, 1966, 41/46,038
Int. Cl. B01d 35/22, 33/00, 35/06
U.S. Cl. 210—19                                18 Claims

ABSTRACT OF THE DISCLOSURE

Magnetic filter consisting of a multiplicity of magnetically permeable particles and magnetically constrictable for decreasing the flow cross-section of the filter passages therethrough, the passages being magnetically enlarged for dislodgement of particles. The magnetic passage restriction is effected by a magneto-attractive force between permanently magnetic particles or by the application of a D.C. field, while the magnetic enlargement of the passages is carried out by the application of a magnetic field, preferably of alternating character.

---

My present invention relates to a method of operating a filtering device as well as an improved filter for the separation of heterogeneous (multi-phase) systems and, more particularly, to a "magnetic" filter suitable for use in purifying a fluid by the removal of solid particles or droplets therefrom or for fractionally separating by size, adsorptivity, magnetic permeability, or other physical characteristic, particulate material in a fluid stream.

While a filter in the usual sense consists merely of a porous mass through which a fluid is conducted and with a pore size dimensioned to retain particles or the droplets entrained in the fluid of a predetermined minimum size, recent developments in the filtering field have given rise to many modifications of the basic system and to a plethora of new applications therefor. Thus filtering systems have been proposed for the grading of the materials by size (e.g. by holding back certain particle-size ranges while permitting others to continue through in a fluid stream), for the removal of a contaminant—such as solid particles—from a liquid stream, for the removal of liquid droplets from a gas stream, for the separation of a dispersed phase in a dispersant liquid, for the molecular separation of gases, etc. When reference is made hereinafter, therefore, to a filtering system it is to be understood as including molecular-sieve filters as well as macro-filtering systems of the character described.

It has been found further, by many workers in the field, that not only the pore size has an effect upon the quality of filtration and the minimum particle size retained, but that the configuration of the pores, the nature of the filtering mass and the means whereby the accumulated or retained product is backwashed or otherwise dislodged are significant factors in the unit cost of the filtering apparatus, the filtration efficiency and the quality of filtration. It may be noted at this point that it has already been suggested by others that a magnetic body may be placed in a liquid stream to be passed through a filter in order to magnetically attract to it metallic particles of a magnetically permeable or attractable character. Such particles are thus recovered in spite of the fact that they may be sufficiently small to pass through the porous filtering mass under normal conditions.

In summary, therefore, it can be stated that all conventional filtering process using a filtering mass, whether an accumulation of discrete bodies or a coherent body, have suffered from difficulties relating to the inability of the operator to accurately gauge the efficiency of the filtering operation and the extent to which the accumulation tends to block further filtration. Additionally, conventional methods of backwashing, dissolution of the retained mass, and the like involve difficulties in terms of the complexity of the equipment and its cost as well as drawbacks in the mode of operation and the effectiveness of the technique.

It is, therefore, the principal object of the present invention to provide an improved method of operating a filtering system whereby the disadvantages of earlier techniques can be obviated and improved filtration efficiency achieved.

A further object of this invention is to provide an improved filtering system whose throughput is relatively high with a high degree of purification of the throughgoing fluid.

Still another object of this invention is to provide a relatively inexpensive and efficient filter which can be cleared at little expense and with much improved cleaning efficiency by comparison with conventional systems.

Yet a further object is to provide an improved method of operating a filter to be subjected alternately to retention and discharge of a fluid-entrained substance.

These objects and others which will become apparent hereinafter are attainable, in accordance with the present invention, by a method of operating a filtrating system which is based upon my surprising discovery that the filtering mass can effectively be constituted as magnetically permeable particles—and preferably magnetized or magnetizable particles—while an external magnetic field is applied to the mass in order to regulate the filtering operation. Thus I have discovered that the application of a strong magnetic field to the mass of particles can be such that the normal gap between them is reduced and a pore size much less than that usually associated with particles of similar configuration and dimension can be maintained during the filtering phase of the cycle. When the particles are permanently magnetic, their natural interparticle attraction provides the magnetic forces tending to draw the mass together to form the compact and small-pore filter.

According to an important aspect of this invention, the external magnetic field is applied to the magnetically permeable mass to facilitate the stripping of the accumulated residue therefrom. Accordingly, the externally applied magnetic field during the stripping operation may be an alternating field imparting oscillation to the individual particles so that each of them acts as a randomly vibrating armature. As adjacent particles are vibrated in phase or out of phase with one another in one direction or another, any material adsorbed thereon will become mechanically loosened at the interface of the particle with the liquid. Similarly, the filter cake will be jostled and loosened so that it can be carried through the temporarily and intermittently enlarged pores by the washing stream. Surprisingly, it has been observed that it is not necessary to backwash the filtering mass since the magnetic vibrations of the filter particle sufficiently widen or enlarge the pores during the washing operation to permit the trapped particles to pass with the washing stream through the filter mass in the same direction as the original filtrate.

By varying the magnetic field applied to the particles in terms of field strength, it is possible to adjust the fluid throughput and the rate of filtration as well as the particle size retained. Moreover, control of the frequency of the alternating external magnetic field enables the loosening and flowing rates to be established at will According to another aspect of the present invention, the particle mass is constituted at least in part of permanently magnetic particles and in part of nonmagnetic particles which are packed together by virtue of the interparticle forces arising between the magnetic particles. The mass can be surrounded by a coil or other means for applying axial or radial flux thereto.

Still another feature of the present invention resides in the use of a magnetically controlled filter of the character described for the purification of electrolytes. I have found that dielectrics and electrolytes (ionically conductive liquids) of the type commonly used in electric-discharge machining (EDM) and in electrochemical machining (ECM), electrochemical grinding (ECG) and other electric material-removing processes can be purified most effectively in a filter whose pore size is reduced by virtue of magnetic forces within the filtrant, with the accumulated residues being diverted from the normal electrolyte-circulation stream upon the electromagnetic agitation of the particles to release such residues. Apparently, the ionic movement among the particles and electromagnetic oscillations applied to them generates eddy currents in the electrolyte which greatly promote the flow of the liquid through the mass. This fact is confirmed when electrolytes and dielectric liquids of the same viscosity and degree of contamination are subjected to filtration. Still another advantage of the present invention resides in an improvement in the filtration efficiency during subsequent filter cycles. Thus it is known that the throughput of filtrate through the filter mass falls off with time as a consequence of the accumulation of a filter cake or residue upon the filtering mass. When the filter is backwashed by conventional processes, the filtering rate for a predetermined head or pressure differential is not restored completely and the operating period before which backwashing is required is reduced from cycle to cycle. Surprisingly, the electromagnetic spreading and agitation of the filter mass, according to the present invention, and the subsequent constriction of the filter pores by the residual magnetic field ensures, as experiments have determined, that the original flow rate for a given head is restored upon each cleaning cycle. This factor decreases the operating cost of the filter and sharply improves the filtering rate on a long-term basis.

The alternating magnetic field applied to the filter particles may have a frequency ranging from 25 cycles to the megacycle range (e.g. to 3 megacycles) although low frequencies of, say, 25–400 cycles permit effective cleaning. In addition, higher-frequency magnetic fields of smaller amplitude may be used to vibrate the particles of the filter mass in order to facilitate desorption of filter residues therefrom.

The above and other objects, features and advantages of the present invention will become more readily apparent from the following description, reference being made to the accompanying drawing in which.

Figure 1:
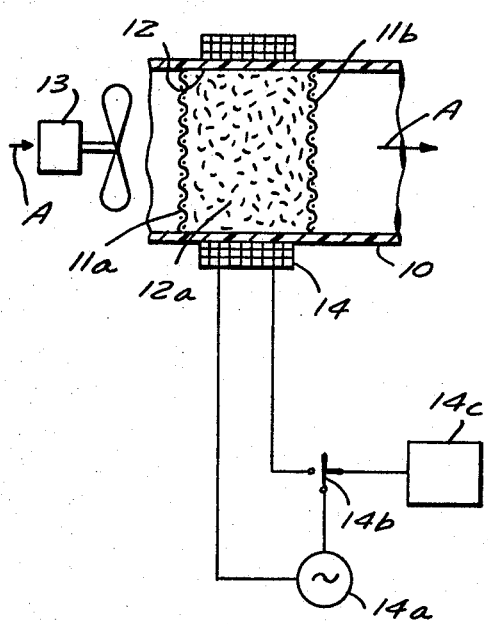
FIG. 1 is an axial cross-sectional view through an in-line gas filter for removing liquid or dust particles from a gas stream.

In FIG. 1, I show a filter for use in the air-intake line of an automotive vehicle, for removing smoke and dust particles from waste gases of industrial installations, for recovering particles from the gases of mills or the like to prevent the development of explosive systems, for the separation of liquids from gases of aerosol systems, and indeed any arrangement in which it is required to remove particles of one phase from the fluid of another. It will be understood that this arrangement is equally applicable to the recovery of solids from liquids, dispersed liquids from dispersant liquids, etc. The filter of FIG. 1 comprises a tube 10 which can be inserted into any convenient fluid duct and has a pair of axially spaced screens 11a, 11b, defining between them a compartment 12 filled with permanently magnetic filter particles 12a. The tube 10 is of a nonmagnetic material (e.g. polyvinyl chloride or some other resin). The magnetic forces among the particles 12a form a small-pore filter which rapidly and efficiency removes particles from the gas stream forced through the tube 10 in the direction of arrow A via a blower 13. It will be understood that not all of the particles need be magnetic but that some magnetic particles (e.g. ferrites) should be included within the particle mass so as to develop the residual magnetic forces referred to earlier. In this case the ferrite or magnetizable component should constitute upwards of 10% by volume of the mass.

According to an important feature of this invention, a magnetic field is applied to the particles to strip the recovered filter cake or residue from them. For this purpose, the tube 10 is surrounded by an electromagnetic coil 14 connected with an alternating current source 14a via a switch 14b controlled by a sensor 14c responsible to the pressure differential across the filter mass 12a for closing switch 14b upon contamination of the filter mass beyond a predetermined level. Energization of the coil 14 with alternating current serves to periodically widen the filter pores and dislodge the accumulated residue so that it passes freely through the filter. Substantially all of this residue is found to be discharged from the filter mass. Upon restoration of a minimum pressure differential, switch 14b is opened and the interparticle magnetic forces restore the small pore size to recommence the cycle.

Example A

As the magnetic filter illustrated in FIG. 1, a mass of magnetic particles consisting of 100 g. of ferrite particles having particle sizes less than 1 mm. was used.

An air stream containing 0.5 g./l. of dust particles consisting of:

40% by weight silica ($SiO_2$),
30% by weight $Fe_2O_3$, and
30% by weight $Al_2O_3$ in admixed state was introduced to this filter by means of the blower illustrated in FIG. 1.

During the filtering operation, 5 g. of the dust particles in total were absorbed in the magnetic filter, the filtrate (the filtered air stream) being 98% purified.

Under this condition, the ferrite particles were magnetically energized at 500 ampere-turns and, in a 30-second recovery operation, 4.8 g. of the dust particles were discharged from the filter.

Figure 2:
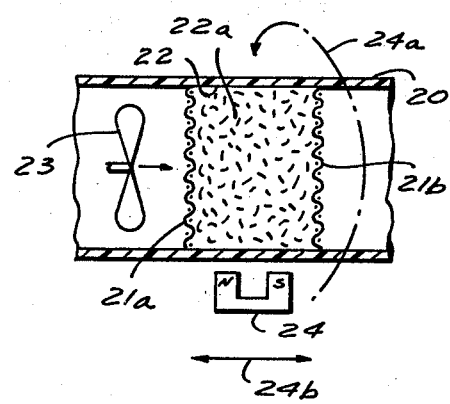
FIG. 2 is a cross-sectional view of a manually operable filter for the purification of gases according to a further feature of the present invention.

FIG. 2 shows a gas filter which may be considered generally similar to that of FIG. 1 but which can have a much larger diameter since it dispenses with a coil arrangement. In this case, the tube 20 also is composed of a nonmagnetic material and receives the particle mass 22a in the compartment 22 between retaining screens 21a and 21b. A blower 23 forces air through the filter mass which can be of the permanent magnetic composition described in connection with FIG. 1. Here, however, the magnetic field for dislodging the filter residue is produced by a permanent magnet 24 which can be manually swung around the mass 22 as indicated by arrow 24a to agitate the particles 22a or cause pore-widening agitation thereof. The permanent magnet 24 can also be moved axially (arrow 24b) as it is swung in the manner indicated. The movement of magnet 24 can, according to this aspect of the invention also be carried out with the aid of a carriage or other movable support for the magnet.

Figure 3:
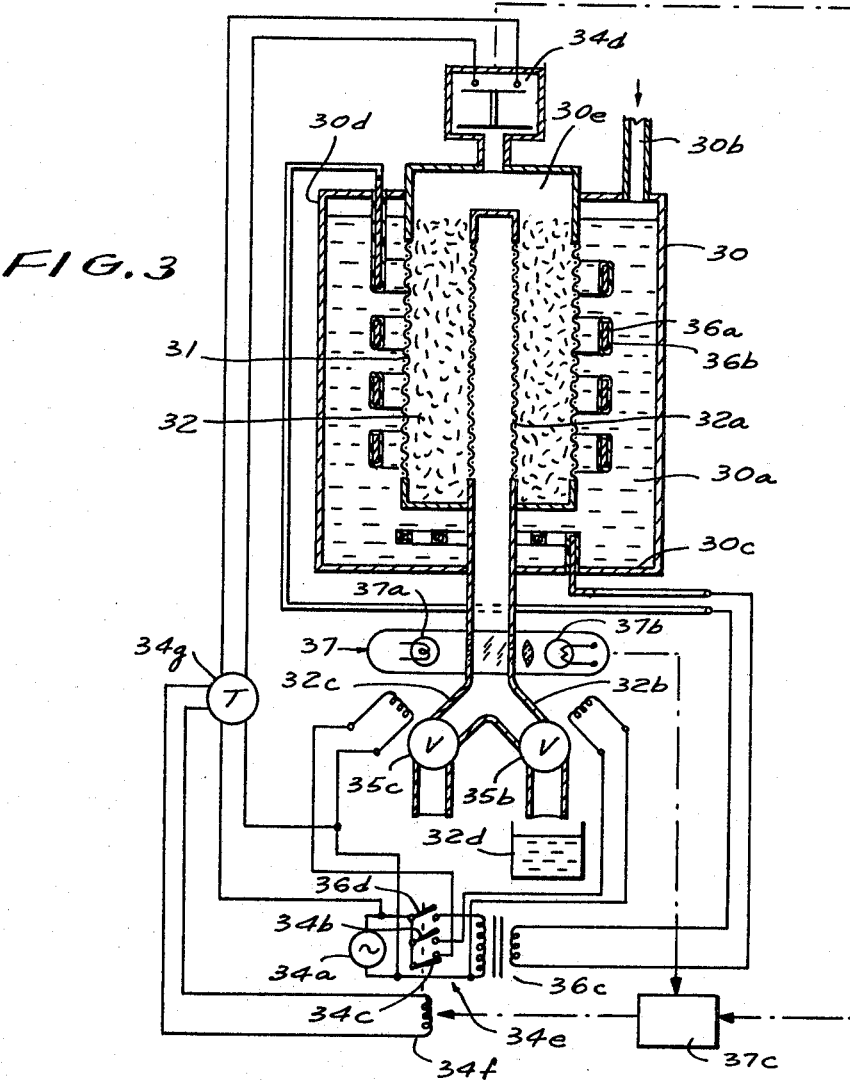
FIG. 3 is an axial cross-sectional view of a filter for the purification of electrolyte for an electrochemical machining system according to the present invention, the remainder of the system being illustrated diagrammatically.

In FIG. 3, I show an automatic-filtering apparatus operable with visibly contaminated solutions and/or electrolytes in which the degree of contamination is a function of the conductivity thereof. Such devices are of particular utility in electric-material-removal apparatus of the ECM or EDM type. The apparatus of FIG. 3 comprises a vessel 30 having a compartment 30a into which the contaminated liquid is introduced via a fitting 30b. A cylindrical screen 31, centrally positioned with clearance within the chamber 30a, forms a holder for the filter mass 32—here made up of barium-ferrite particles or an equivalent permanent magnetic material alone or admixed with other filtrant substances. The cylindrical screen 31 and the filtrant 32 are carried by a perforated tube 32a extending centrally through the filter mass 32 and anchored in the floor of the vessel 30. Thus a filtrate passing radially inwardly through the filter mass 32 will be collected by the perforated tube 32a and conducted from the filter. The vessel 30 is closed at 30d so as to form a compressible-fluid compartment 30e above the liquid surface within this vessel. A membrane pressure-responsible switch 34d is triggered by the pressure within the vessel to signal an excessive pressure drop across the filtering mass indicative of contamination or excessive collection of residue.

The collecting tube 32a has, at its discharge end, branches 32b and 32c for the contaminated or washing liquid and the purified filtrate, respectively, the branch 32c being connected in a liquid-recirculation path for return to the contaminating station; branch 32b advantageously empties into a receptacle 32d for the contaminated liquid. Automatic diversion of the liquid stream in accordance with the nature thereof is effected by a pair of solenoid valves 35b and 35c respectively disposed in the branches 32b and 32c. The valves 35b and 35c are alternately energizable from an A.C. source 34a via respective switch contacts 34b and 34c of a relay 34e to switch filtrate flow between the branches.

The relay 34e has its coil 34f connected to a timer 34g which, in turn, is actuated by the pressure-responsible switch 34d. The filter mass 32 is surrounded by a helical coil 36 capable of applying an axial magnetic field to the magnetizable and magnetic particles of the filtrant, this coil being formed by a busbar core 36a of copper or aluminum encased in a plastic sheath 36b. The coil 36 is energized via a transformer 36c whose primary winding is in circuit with the normally open switch contact 36d of the relay 34e.

Thus the following mode of operation can be discerned:

In the state of the apparatus illustrated in FIG. 3, the coil 36 is unenergized so that residual magnetic or permanent-magnet forces between the particles of the filtering mass 33 draw them together and form a small-pore filter. When the filter is noncontaminated (during its initial condition), a contaminated liquid is introduced at 32b and flows through the filter mass 32 so that contaminated particles are trapped by the filter mass, blocked by the small pores thereof or adsorbed upon the particles. The pressure-sensitive switch 34d is open and the timer 34g unenergized so that relay 34e is unengerized. Through the normally closed contact 34c of this relay the valve 35c is open while open contact 34b ensures that valve 35b will be closed. Consequently, the purified filtrant is collected by the perforated tube 32a and permitted to recirculate via branch 32c.

As contamination of the filter mass 32 increases, the rate of fluid flow through the latter falls off and a pressure head builds up in compartment 30e. When a predetermined pressure level indicative of a corresponding level of filter contamination is attained, the switch 34d energizes the timer 34g which in turn operates the relay 34e for a predetermined time span sufficient to allow clearing of the filter. Upon energization of this relay 34e, the contacts 34b and 36d close simultaneously to energize the valve 35b and the coil 36 while valve 35c is closed. The magnetic particles of the filter are thus subjected to alternating-current agitation and the filter residue can be loosened and carried out through the filtered mass in the manner previously indicated. Thus the portion of contaminated liquid continuing to flow through the system serves as a washing agent and conducts the residue via branch 32b into the receptacle 32d. At the end of the predetermined time period established by the timing means 34g and selected to correspond to a time period sufficient to ensure cleaning of the filter 32, the relay 34e is de-energized and the original filtering state of the system re-established. It will be understood that this mode of operation not only permits purification of a liquid but also separation of particles of different sizes by their respective sizes when such particles are carried in a suitable fluid vehicle. In that case, the recovered liquid at 32d will contain the desired particle fraction for each stage of fractionation.

In order to ensure proper switchover of the liquid branches (e.g. to prevent inadvertent return of contaminated liquid to the recirculation system) or as a substitute for the timer means 34g described above, I provide sensing means 37 responsive to the degree of contamination of the liquid. Here the sensing means 37 comprises a light source 37a disposed opposite a photoelectric cell 37b across a transparent portion of the tube 32, the photoelectric cell being connected to a threshold-type amplifier 37c which, in turn, energizes the relay 34e. Thus the pressure-responsive switch 34d can energize the amplifier 37c upon the buildup of an excess head to energize the relay 34e. When the contaminated wash liquid emerges, its coloration is detected by the sensor 37 and, via the amplifier 37c, holds the relay 34e in its energized state until a substantial reduction in contamination of the washing liquid is detected. Thereafter, the relay 34e is permitted to open and proper filtering is restored. A conductivity cell can be substituted for the photoelectric means of FIG. 3 to perform a similar function.

Figure 4:
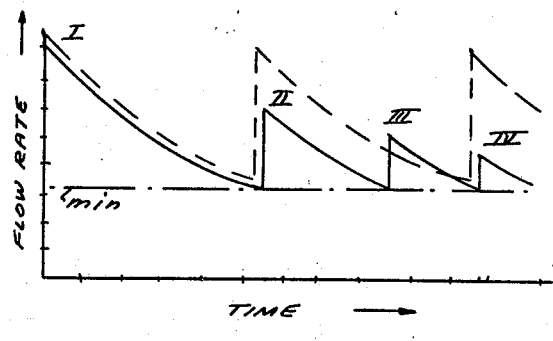
FIG. 4 is a graph illustrating the comparative efficiencies of a conventional backwash filter and the improved filter.

In FIG. 4, I show a graph of the flow rate (plotted as the ordinate) against time (e.g. in hours) plotted along the abscissa for a backwash filter and one operated in accordance with the present invention. The solid-line curve represents a number of cycles of filtration followed by backwash periods during which the conventional filter is cleared. It can be seen that at the successive cycles II–IV, the filtering flow rate cannot be restored to the original flow rate I and, since backwashing is determined when the flow rate falls to a predetermined minimum value (min.), the filtering cycles become shorter and shorter until filtering is no longer economical and the mass must be changed. For the purpose of comparison, a corresponding graph of the flow rate versus time is presented in broken lines for the system of FIG. 3. From this graph, it is clear that successive cycles are as long as the earlier cycles and that the filter is restored to practically its original level by each wash period using magnetic field energization of the particles. The life of the filter is obviously many times greater when it is operated in this manner.

Figure 5:
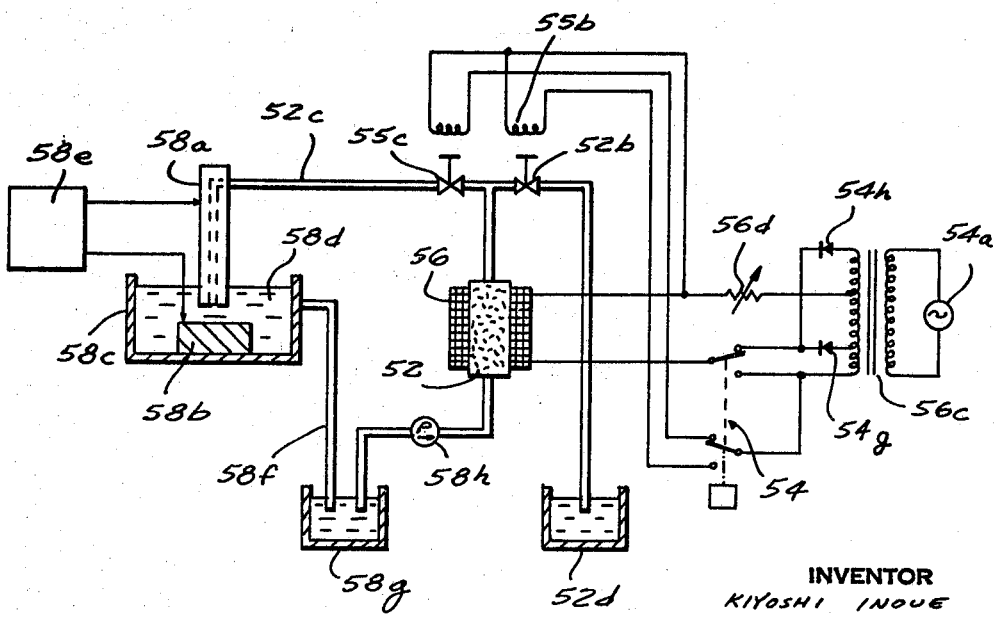
FIG. 5 is a diagram of a liquid cleaning system for an ECM or EDM system.

In FIG. 5, I show the system of FIG. 3 as applied to an electrochemical or electric-discharge machining arrangement. Here the apparatus comprises a tubular electrode 58a juxtaposed with the workpiece 58b in a receptacle 58c whose liquid medium 58d is contaminated with metallic particles and sludge developed by the electrolytic or electro-erosive action between the electrode and the workpiece. The power supply 58e connected across the workpiece and the electrode may be of any of the types described in my U.S. Patents Nos. 3,089,018, 3,122,628 and 3,252,881. The electrolyte is conducted via line 58f into a settling tank 58g for sedimentation of the larger particles, with the supernatant liquid being decanted by a pump 58h and fed to a magnetic filter 52 of the type illustrated in FIG. 3.

From this filter, purified liquid is returned via the branch 52c and the valve 55c to the hollow electrode 58a while contaminated liquid passes through the branch 52b and the valve 55b to a connecting vessel 52d. The switch assembly 54 operates in the manner previously described to energize the coil 56 simultaneously with the valve 55b when the valve 55c is closed to clear the filter. The switch assembly 54 can be controlled by timer means, photoelectric means and conductivity means as described. The magnet 56 is energized with alternating current via a transformer 56c from an A.C. source 54a over one contact of the relay 54 with an amplitude determined by the variable resistor 56d, thereby permitting control of the stroke of the magnetic particles. The solenoid valves 55c and 55d are reversibly energized via another pair of contacts of the relay while a pair of rectifiers 54g and 54h serve to supply a unidirectional current to the coil 56 concurrently with energization of the electromagnetic valve 55c. Thus a unidirectional and nonalternating magnetic field acts upon the particles during normal filtering operation to augment the permanent magnet or residual magnetic forces drawing the particles together. When the filter is to be cleaned, an alternating magnetic field is applied as mentioned earlier.

Figure 7:
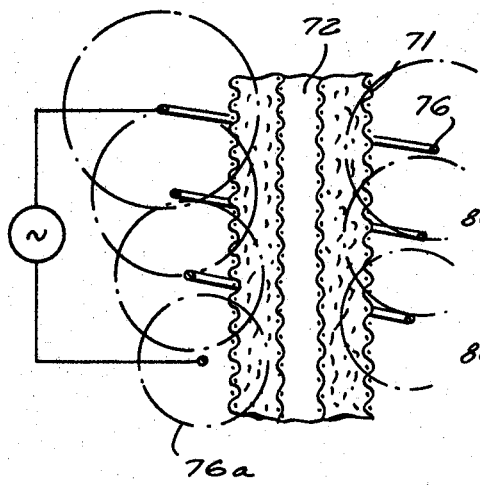
FIGS. 7 and 8 are cross-sectional views of other filters in accordance with the present invention.
Figure 8:
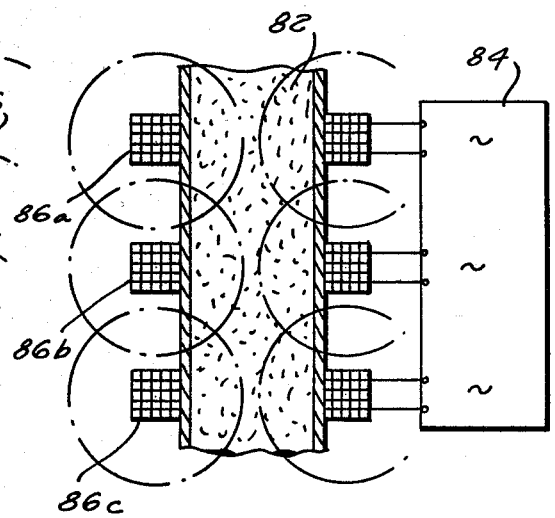

In FIG. 7, I show a magnetic filter 72 retained in a sleeve 71 and constituted of magnetic particles, this filter being surrounded by a coil 76 of conical configuration. Thus the magnetic flux attributable to the small-diameter turns (represented by flux lines 76a) can be seen to act upon the proximal particles at a much smaller distance than the magnetic field generated by the larger diameter turns. The alternating magnetic field thus vibrates the particles at one end of the filter with a greater amplitude than at the other end in accordance with the relative diameter of the turns. Advantageously, the smaller-diameter turns are located proximal to the inlet side of the filter or the side most likely to be contaminated. In the modification of FIG. 8, a plurality of axially spaced coils 86a, 86b and 86c are energized by an A.C. source 84 in out-of-phase or phase-shifted relationship or at different frequencies in order to further augment the oscillation of the magnetic particles 82 of the filter. When the coils 86a–86c are energized in succession (i.e. by a rapid train of pulses), the migration of the contaminants along the filter is facilitated. Either of the magnetic arrangements illustrated in FIGS. 7 and 8 can be substituted for the magnetic means 36, 56 of the embodiments of FIGS. 3 and 5.

Figure 6:
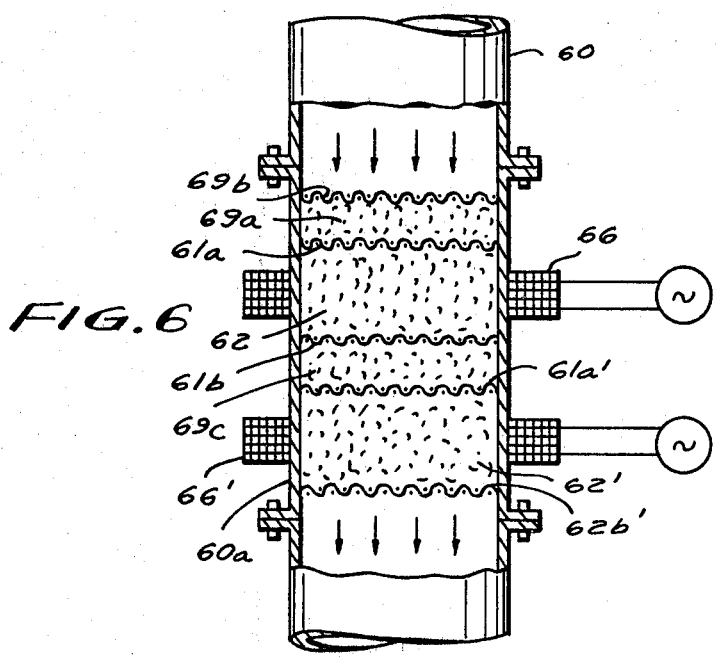
FIG. 6 is an axial cross-sectional view illustrating still another filtering apparatus.

In FIG. 6, I show an in-line filter of a highly efficient type using magnetic particles, this filter comprising a tube 60 along which a nonmagnetic section 60a is disposed. This filter section contains a pair of magnetic-particle layers 62 and 62' retained between respective screens 61a, 61b and 61a', 62b'. The magnetic layers, composed, for example, of barium ferrite particles, can be energized in phase or out of phase by magnetic coils 66 and 66' surrounding the respective layers externally of the tube 68. The filter of FIG. 6 is particularly suitable for the removal of dust and like particles from dielectric-fluid streams and thus comprises an initial electrostatic layer of particles 69a adapted to attract to them particles of opposite charge. A suitable electrostatic filter can be composed of particles as will be apparent hereinafter. The layer 69a is held in place between the screen 61a and a further screen 69b. Between the magnetic layers 62 and 62', I provide a further electrostatic layer 69c of an electrical charge opposite that of layer 69a and again designed to attract particles of opposite charge. I have found that positively charged particles in a fluid stream can be readily attracted to relatively negative particles in accordance with the dielectric constant of the liquid. Thus, one of the electrostatic layers, when the fluid (filtrate) is distilled water, may be composed of lead, antimony, barium carbonate, or silica particles (for trapping negatively charged particles) whereas the oppositely charged electrostatic layer will include gold, silver, platinum, carbon, sulfur, kaoline or asbestos particles (for trapping positively charged particles). For trapping carbon particles positively charged in kerosene used, e.g. as an EDM liquid vehicle, the electrostatic layer may be relatively negative iron particles and vice versa. The magnetic layers 62 and 62' may consist of a barium ferrite (e.g. $BaO \cdot 6Fe_2O_3$), Alnico alloys or other permanently magnetic materials (Mn-Al alloys).

During cleaning operation of the filter mass, the magnetic particles are magnetically energized by the alternating field to deliver the residue and dust adsorbed thereon as previously described. It should be noted that in this stage, the electrostatic particles are subjected to mechanical oscillation correspondingly to movement of the magnetic particles to dislodge the trapped particles.

Example I

The magnetic filter of FIG. 3 was used to remove particles ranging in size from $1\mu$ to 0.1 mm. from liquid containing 800 g. of such particles. The contaminated liquid was pumped through 14 kg. of filter particles having a sieve size of 2 to 5 mm. and contained in a cylinder 500 mm. diameter with a length of 300 mm., the flow rate was 8 liter/min., and the magnetic particles consisted of Mn-Al alloy. The particles of the contaminated liquid, upon analysis, were composed of 30% iron, 10% $SiO_2$, 10% $Al_2O_3$, 40% brass and 10% nickel. After filtering at the indicated rate, the particles were magnetically energized at 300 ampere-turns with 50 cycle alternating current for two minutes and the subsequent stream of liquid collected. This stream was found to contain 788 g. of particles of the analysis indicated. A purification or filter efficiency of more than 98% was obtained. There was substantially complete elimination of all trapped particles from the filter.

Example II

Using the apparatus illustrated in FIGS. 3 and 5, an EDM liquid was filtered. In the EDM system, a copper electrode was used to machine 0.55% carbon steel (S55C). The dielectric liquid (i.e. kerosene) was supplied at a rate of 1–2 liters/min. and machining carried out the approximately 2 gr./min. to a roughness of $50\mu$ $H_{max}$. The filter particles (2 kg.) were composed of barium ferrite and had a sieve size of 0.1 mm.

During the operation of the filter without application of an external field, the inherent magnetic forces gave rise to a filter efficiency such that the liquid recirculated to the machining electrode was of 93% clarity. When a D.C. field (FIG. 5) was applied at 500 gauss, 4.4 kg. of filter residue were recovered in 70 hours of operation, the filtrate being of 95 to 96% clarity. When the D.C. field was doubled to 1000 gauss, 4.8 kg. of residue were obtained in 70 hours and the filtrate found to be of 96% purity. The use of a 5 kilogauss D.C. magnetic field yielded 5.2 kg. of residue in 70 hours of operation, corresponding to 98% clarity of the filtrate. After 70 hours filtering intervals, the alternating current magnetic field was applied for 10 seconds (at 500 gauss, 50 cycles) and the filter mass found to be thoroughly freed of residue such that it returned to its original state.

Example III

A kerosene EDM liquid containing 5 g./l. machining chips consisting essentially of carbon and iron particles was filtered by the apparatus illustrated in FIG. 6. The magnetic filter mass surrounded by a two-turn coil was constituted of a layer of 15 cm. diameter and 4 cm. thickness consisting of 5–10 mesh particles of barium ferrite. The electrostatic layers of 3 cm. thickness, consisting of pure-iron particles of 50 mesh, were disposed upon screens spaced from the magnetic layers respectively by distances of 2 mm. The filtering operation was continued with a liquid flow-rate of 4 liters/minute for one hour and 50 minutes until contamination emerged at the liquid outlet. Upon this condition, an alternating current of 150 amperes was supplied to the coils for about 10 seconds while the liquid flow rate was increased to 8 liters/minute and the filter was completely resorted to its original condition. For comparison with respect to efficiency, another test was carried out in which the filter was constituted only by the magnetic layer of 10 cm. thickness. In this case, the discharged liquid (filtrate) was in a contaminated state in 30 minutes.

It will be understood that the improved filtering effects of the present invention not only increase the useful life of the filter mass and decrease the downtime of the filter but also permit the use of smaller pumps, filter casings and duct systems inasmuch as the filtration rate is increased and the filtration pressure reduced in the long run. Unlike back-pressure washing, the present system does not need a separate system for feeding clean liquid in counterflow through the filter nor were the complex bypass and shunt arrangements of backwash filters necessary here. The usually prolonged backwash periods are also saved.

The invention described and illustrated is believed to admit of many modifications within the ability of persons skilled in the art, all such modifications being considered within the spirit and scope of the appended claims.

I claim:

1. In a method of operating a filter for the removal of particles including at least some nonmagnetic particles entrained in a fluid by passing said fluid through a confined porous filter mass constituted at least in part of magnetically permeable granules other than the particles in said fluid, the improvement which comprises the steps of:
   (a) magnetically constricting the passages of said mass during the passage of said fluid therethrough for collecting said particles upon said filter mass by maintaining a continuous magnetic attraction between said magnetically permeable granules of said confined porous filter mass; and
   (b) thereafter magnetically enlarging said passages by applying an alternating magnetic field from the exterior of said mass to said granules to oscillate same while flushing said mass with a fluid to dislodge the particles trapped by said mass.

2. The improvement defined in claim 1 wherein said filter mass includes at least some retentively magnetic granules and said passages are constricted in step (a) by the magneto-attractive forces between said retentively magnetic granules.

3. The improvement defined in claim 2 wherein at least some of said filter granules are nonmagnetic and are held by the magnetic forces between said retentively magnetic granules in a tightly packed porous body.

4. The improvement defined in claim 1 wherein said mass is composed at least in part of magnetizable filter granules and said passages are constricted in step (a) by the application thereto of an external unidirectional magnetic field tending to draw said filter granules together.

5. The improvement defined in claim 4 wherein said filter has a fluid inlet on one side thereof and a branched outlet on another side thereof with said fluid passing through said filter mass from said inlet to said outlet, said improvement further comprising the step of simultaneously switching the fluid flow from one of the outlet branches to another outlet branch upon the termination of step (a) and the commencement of step (b).

6. The improvement defined in claim 5, further comprising the steps of detecting the quantity of fluid-entrained particles trapped by said mass and terminating step (a) while commencing step (b) upon said quantity attaining a predetermined level and thereupon terminating step (b) and repeating step (a) upon the lapse of a predetermined time interval.

7. The improvement defined in claim 1 wherein said filter mass comprises electrically charged granules capable of electrostatically entrapping oppositely charged particles entrained in said fluid.

8. The improvement defined in claim 1 wherein said fluid is a liquid medium circulated to an electrochemical or electric-discharge electrical material-removing apparatus.

9. A filter assembly for the removal of particles including at least some nonmagnetic particles from a fluid entraining same, comprising a receptacle having an inlet and an outlet for the throughflow of said fluid, a mass of filter granules other than the particles entrained in said fluid confined within said receptacle forming passages for said fluid and including at least some magnetic granules other than the particles entrained in said fluid drawn together by a continuous magneto-attractive force to constrict said passages, means to apply said attractive force, means including a source of alternating current and a coil energized thereby surrounding said mass for magnetically activating said mass externally thereof to enlarge said passages and oscillate said granules whereby a flow of fluid through said mass upon the enlargement of said passages will carry entrapped particles from said fluid through said mass, and means to flow said fluid through said mass during the application of the alternating current.

10. An assembly as defined in claim 9, further comprising means for applying a unidirectional magnetic field to said magnetic filter granules for constricting said passages.

11. An assembly as defined in claim 10 wherein said coil surrounds said filter mass and said means for applying said unidirectional magnetic field includes a source of direct current connectable to said coil.

12. An assembly as defined in claim 9 wherein said outlet has two branches and electrically controlled valve means at said branches for diverting filtrate at said outlet alternately into said branches, said assembly further comprising control means for energizing said coil and said valve means substantially concurrently whereby filtrate flows through one of said branches in a magnetically constricted state of said passages and through the other of said branches upon energization of said coil by said alternating current source.

13. An assembly as defined in claim 12 for use in combination with an apparatus for the electrical machining of a conductive workpiece and comprising an electrode juxtaposable with said workpiece, a liquid medium surrounding juxtaposed regions of said workpiece and said electrode and constituting said fluid, and power-supply means for passing an electric current through said electrode and said workpiece capable of eroding said workpiece in the regions thereof confronting said electrode to form said particles in said fluid, said assembly further comprising circulation means including said inlet, said receptacle, and said one of said branches of said outlet for withdrawing said liquid from the region of said electrode, filtering the liquid and returning it to the region of said electrode.

14. An apparatus as defined in claim 12 wherein said control means includes pressure-responsive means communicating with said receptacle for sensing the increase in the pressure drop across said filter mass indicative of contamination thereof by said fluid-entrained particles and connected with said coil for energizing same from said alternating-current source, and timer means for disconnecting said coil from said alternating-current source and energizing said valve means to restore filtrate flow through said one of said branches upon the lapse of a predetermined time interval sufficient to clear accumulated residue from said filter mass.

15. An assembly as defined in claim 14, further comprising sensing means responsive to the degree of contamination of said filtrate with said fluid-controlled particles for energizing said valve means to switch filtrate flow from said one of said branches to said other branch.

16. An assembly as defined in claim 9 wherein said filter mass includes electrically chargeable granules for the electrostatic adsorption of oppositely charged fluid-entrained particles.

17. An apparatus as defined in claim 16 wherein said filter mass consists at least in part of ferrite granules.

18. An apparatus as defined in claim 16 wherein said filter mass consists at least in part of barium ferrite.

References Cited

UNITED STATES PATENTS

| | | | |
|---|---|---|---|
| 2,398,725 | 4/1946 | Schutte | 210—223 X |
| 2,999,275 | 9/1961 | Blume | 210—222 X |
| 3,271,283 | 9/1966 | Clifford et al. | 204—224 X |
| 3,349,918 | 10/1967 | Ike | 210—223 |
| 3,382,978 | 5/1968 | Rosaen | 210—90 |
| 2,452,220 | 10/1948 | Bower | 209—224 X |
| 2,943,739 | 7/1960 | Maynard | 210—223 |
| 2,954,122 | 9/1960 | Colburn | 210—222 X |

FOREIGN PATENTS

| | | |
|---|---|---|
| 803,177 | 7/1956 | Britain. |
| 1,012,871 | 10/1952 | Germany. |

OTHER REFERENCES

Encyclopedic Dictionary of Physics, vol. 4, Pergamon Press, New York, 1961, p. 437 et al.

REUBEN FRIEDMAN, Primary Examiner

T. A. GRANGER, Assistant Examiner

U.S. Cl. X.R.

210—81, 223